United States Patent Office 3,228,829
Patented Jan. 11, 1966

3,228,829
PRESERVATION OF AQUEOUS DISPERSIONS
Paul A. Wolf and Charles R. Scott, Midland, Mich., assignors to The Dow Chemical Company, Midland, Mich., a corporation of Delaware
No Drawing. Filed Nov. 4, 1963, Ser. No. 321,352
20 Claims. (Cl. 167—33)

This invention relates to a new and improved process for the preservation of aqueous organic mixtures such as emulsions, dispersions, and solutions against microbial attack.

Water-containing organic mixtures such as emulsified cutting oils, latexes, latex paints, aqueous adhesives, hydraulic fluids, and pulp dispersions used in paper-making, in the absence of an effective germicide, are characteristically subject to attack by putrefactive bacteria, particularly, species of Pseudomonas and Aerobacter which cause loss of useful properties, foul odors, slime formation, and the possibility of skin infections in persons handling these materials. The problems involved in preserving such water-containing systems against microbial decomposition are many and varied and a very considerable amount of work has been done in efforts to find protective substances which meet the numerous requirements. The variety of materials offered for the purpose is, to some extent, evidence that none is without disadvantage.

The first requisite of such a preservative is, of course, its activity and effectiveness against the offending organisms. Contributing to the effectiveness of a preservative are its stability and its persistence in the system. To exert its activity in these systems, the preservative must have a degree of water solubility. Where the aqueous system is subject to handling, the preservative should be non-irritating to the skin under the conditions of use. For reasons of waste disposal, it is becoming increasingly important that the toxicity of these preservative materials to fish be relatively low.

We have found that adducts of certain unsaturated halides with hexamethylenetetramine are effective germicides when present in concentrations as low as 0.01 percent in aqueous systems such as named above. In particular, we have found that adducts formed by the reaction of hexamethylenetetramine with an olefinically or acetylenically unsaturated bromide, chloride, or iodide, the halide molecule containing no more than eight carbon atoms, possess not only the antimicrobial activity of the unsaturated halides, but also other valuable properties such as high stability and persistence, as compared to the halides, suitable solubility, being substantially non-irritating to the skin under the conditions of use, and having a low order of toxicity to fish.

Unsaturated halohydrocarbons which form adducts with hexamethylenetetramine having particularly high activity are dihaloalkenes and haloalkynes such as propargyl bromide, propargyl chloride, 1,3-dichloropropene, diiodoacetylene, and 1,4-dichloro-2-butyne. These halohydrocarbons form a 1:1 adduct with hexamethylenetetramine even though more than one active halogen may be present in the halohydrocarbon molecule.

The unsaturated halide-hexamethylenetetramine adducts may easily be prepared by mixing together the proper amounts of the two reactants in a suitable solvent at or about room temperature. Solvents mentioned in the literature as suitable for use in this general reaction are chloroform, methanol, and ethanol.

The unsaturated halides used to make these compounds have considerable antimicrobial activity themselves, but they are not suitable for use in these applications because of relatively high volatility and therefore low persistence, and also because of their insolubility in water. They are also irritating to the skin and their vapors are strongly irritating to eyes and nose. Hexamethylenetetramine has a low order of activity in such applications although it has high water solubility. The hexamethylenetetramine adduct of the halide may therefore be regarded as a means whereby the halide is solubilized and made available as a non-volatile, non-irritating, relatively stable solid. Thus, the activity of the unsaturated halide is made effective and suitably persistent.

These compounds were tested as preservatives in aqueous cutting oil emulsions as follows: The oil used was a typical industrial cutting oil consisting essentially of light mineral oil, an organic emulsifier, an aliphatic alcohol coupling agent, and minor amounts of other components. The emulsion was prepared by diluting one part of oil with forty parts of water. To a sample of this emulsion was added the stated amount of the compound being tested and 5 percent by volume of a cutting oil emulsion which was badly contaminated with bacterial growth after industrial use. The inoculated sample was shaken at room temperature. After 24 hours and 48 hours, swabs of the sample were streaked on nutrient agar petri plates which were then incubated 48 hours at 30° C. before examination. The inoculation and subculture were repeated twice. An effective concentration of a compound was taken as that which would kill all organisms after three inoculations.

Tests showing the superior activity and persistence of an amine-halide compound over both the amine and the halide separately are summarized in the following table:

TABLE I

| Compound | Conc., g., mols/liter | Growth on Agar Plates | | | | | |
|---|---|---|---|---|---|---|---|
| | | After 1st Inoc. | | After 2nd Inoc. | | After 3rd Inoc. | |
| | | 24 hrs. | 48 hrs. | 24 hrs. | 48 hrs. | 24 hrs. | 48 hrs. |
| Hexamethylenetetramine | 0.07 | Heavy | Heavy | | | | |
| Propargyl Bromide | 0.004 | None | None | Heavy | Moderate | Heavy | Heavy |
| Propargyl Bromide Compound with Hexamethylenetetramine. | 0.0004 | Trace | None | None | None | None | None. |
| Same | 0.001 | None | None | None | None | None | None. |

The activity of various unsaturated halide-hexamethylenetetramine adducts of the type which is the subject of this application is shown in Table II. The testing medium was the same cutting oil emulsion used in Table I.

TABLE II

| Compound | Through 3 Inoculations, p.p.m. of Compound Giving— | |
|---|---|---|
| | 100% Kill | Incomplete or no Kill |
| Hexamethylenetetramine compound with propargyl bromide | 250 | 100 |
| Hexamethylenetetramine compound with 1,3-dichloropropene | 250 | 100 |
| Hexamethylenetetramine compound with propargyl chloride | 250 | 100 |
| Hexamethylenetetramine compound with 1,4-dichloro-2-butyne | 250 | 100 |

In industrial use, cutting oil emulsions become contaminated not only with dirt containing microorganisms, but also with hydraulic oils leaked from hydraulically operated control systems on the cutting machines. This hydraulic oil floats on the top of the cutting oil emulsion and tends to extract any oil-soluble material therefrom. Many well-known germicides now used are oil-soluble enough so that their concentration in the cutting oil emulsion may be seriously reduced in this way. The hexamethylenetetramine adducts of unsaturated halides which we have found to be highly active have low oil solubilities and are therefore less subject to this depletion.

The acute toxicity to fish is a factor which must be considered in relation to the problem of waste disposal involved in the use of an industrial preservative. The fish toxicity of a representative compound of the class claimed is compared with the toxicities of its components in Table III.

TABLE III

| Compound | g. Mols Compound per Liter | |
|---|---|---|
| | 100% Survival [1] | 100% Fatal |
| Hexamethylenetetramine compound with propargyl bromide | 4×10⁻⁴ | 8×10⁻⁴ |
| Propargyl bromide | 8×10⁻⁷ | 8×10⁻⁵ |
| Hexamethylenetetramine | | 1.4×10⁻³ |

[1] Representing survival or death of 5 out of 5 Lake Emerald shiners (*Notropis atherinoides acutus* [Lapham]) in 3 day test.

A further advantage of the unsaturated halide-hexamethylenetetramine adducts which are the subject of this application is the fact that they are substantially non-irritating to the skin in the range of concentration in which they are used. Many of the aqueous systems in which these compounds are useful as preservatives are subject to handling and therefore a non-irritating preservative is a definite requirement. Among such systems, in addition to aqueous cutting oil emulsions are latex paints, aqueous adhesives, and water-containing hydraulic fluids. The compound of hexamethylenetetramine with propargyl bromide, for example, was tested by applying a 0.1% solution in an aqueous cutting oil emulsion to the shaved belly of a rabbit. This application produced no more sign of irritation than a similar application of the cutting oil emulsion alone.

These unsaturated halide-hexamethylenetetramine adducts are soluble in the presence of anionic surfactants and so have the advantage of undiminished activity whereas some known germicides of similar structure are precipitated under these conditions.

Aqueous systems in which these new preservatives may be used to advantage include cutting oil emulsions, hydraulic fluids, adhesives, aqueous coating compositions such as latex paints, pulp dispersions used in papermaking, and similar aqueous organic emulsions and suspensions which are subject to attack by the same classes of bacteria. Examples 1–4 illustrate the use of these preservatives in various polymer latex compositions.

Example 1

Latex floor polish formulations were made up from the following ingredients:

| | Parts |
|---|---|
| Aqueous polystyrene latex (48% solids) | 390 |
| Benax 2A1 | 40 |
| Ammonium persulfate | 1.5 |
| Sodium bicarbonate | 1.5 |
| Water | 567 |
| Hexamethylenetetramine salt of 1,3-dichloropropene | 0–1 |

Proportions are listed in parts by weight. Benax 2A1 is the disodium salt of dodecyl diphenyl ether disulfonate.

After thorough mixing, the above formulations were inoculated with a pooled culture of bacteria individually grown in nutrient broth. These bacteria had been isolated from spoiled polymer latices and latex paints and were largely Pseudomonas and Aerobacter species. The inoculated samples were incubated for 24 hours at 30° C. and then were streaked with a sterile swab on the surface of a nutrient agar petri plate. This agar plate was incubated for 48 hours at 30° C. and the presence or absence of viable bacteria in the latex polish sample was determined by the corresponding presence or absence of bacterial growth on the agar. Samples of polish containing as little as 0.05% by weight of the hexamethylenetetramine-1,3-dichloropropene adduct withstood four such inoculations and incubations without evidence of living bacteria. A sample of latex polish containing no preservative spoiled after one such inoculation.

Example 2

Two latex paint compositions were made up from the following ingredients. The quantities are given in pounds per 100 gallons of paint.

A

| | |
|---|---|
| Water | 128 |
| Defoamer NXZ | 1 |
| Pigment dispersant (Daxad 30) | 8 |
| Titanium dioxide | 200 |
| Calcium carbonate | 237 |

B

| | |
|---|---|
| Methocel 90 HG | 150 |
| Water | 100 |
| Latex, Elvacet 1423 | 1 |
| Hexamethylenetetramine salt of 1,3-dichloropropene | 0.2% |

Daxad 30 is a commercially available dispersant sold by the Dewey and Almy Chemical Division.

Defoamer NXZ is a commercial preparation of Nopco Chemical Company.

Methocel 90 HG is a methylcellulose sold by The Dow Chemical Company for use as a thickening and emulsifying agent.

Elvacet 1423 is a polyvinyl acetate emulsion, a product of E. I. du Pont de Nemours & Company.

The ingredients under A were combined in a high speed mixer and the B components were then added and the whole was thoroughly mixed. The two paint samples thereby obtained, one containing no preservative and the other containing 0.2% by weight of the hexamethylenetetramine-1,3-dichloropropene additive, were then inoculated and incubated as described in Example 1. The sample containing no preservative spoiled after one such treatment. The paint sample containing preservative was still sterile after eleven inoculations and incubations.

Example 3

A sample of Latex 512K, a styrene-butadiene copolymer latex produced by The Dow Chemical Company, was repeatedly inoculated and incubated with pooled bacteria as described in Example 1 after incorporation in the latex of 0.025% by weight of the hexamethylenetetramine salt of 1,3-dichloropropene. After fifteen such treatments, the latex remained sterile. A sample of the same latex to which no preservative had been added was badly contaminated with bacteria after one inoculation and incubation.

*Example 4*

Example 3 was repeated using the hexamethylenetetramine salt of propargyl chloride as the preservative. Similarly, 0.025% of the preservative maintained the latex in sterile condition through fifteen inoculations and incubations as previously described.

These compounds have also shown activity against slime-producing organisms and are useful in slime control in paper pulp processing operations. The compound of diiodoacetylene with hexamethylenetetramine has shown particularly high activity against microorganisms causing formation of slimes. A concentration of 10 p.p.m. of this compound was sufficient to give 100% kill of these organisms in an in vitro test.

This application is a continuation-in-part of our application filed July 29, 1960, Serial Number 46,093 now abandoned.

We claim:

1. An aqueous organic mixture normally subject to attack by putrefactive bacteria containing as an antimicrobial additive therefor a small but effective amount of a salt of hexamethylenetetramine with an unsaturated aliphatic halohydrocarbon of two to about eight carbon atoms selected from the group consisting of a dihaloalkene and a haloalkyne, the halogen of which has an atomic number from 17 to 53 inclusive.

2. The mixture of claim 1 wherein the unsaturated halohydrocarbon is a dihaloalkene.

3. The mixture of claim 2 wherein the dihaloalkene is 1,3-dichloropropene.

4. The mixture of claim 1 wherein the unsaturated halohydrocarbon is a haloalkyne.

5. The mixture of claim 4 wherein the haloalkyne is propargyl chloride.

6. An organic polymer latex composition containing as an antimicrobial additive therefor a small but effective amount of a salt of hexamethylenetetramine with an unsaturated aliphatic hydrocarbon of two to about eight carbon atoms selected from the group consisting of a dihaloalkene and a haloalkyne, the halogen of which has an atomic number from 17 to 53 inclusive.

7. The composition of claim 6 wherein the unsaturated halohydrocarbon is a dihaloalkene.

8. The composition of claim 7 wherein the dihaloalkene is 1,3-dichloropropene.

9. The composition of claim 6 wherein the unsaturated halohydrocarbon is a haloalkyne.

10. The composition of claim 9 wherein the haloalkyne is propargyl chloride.

11. An aqueous emulsified cutting oil composition containing as an antimicrobial additive therefor a small but effective amount of a salt of hexamethylenetetramine with an unsaturated aliphatic halohydrocarbon of two to about eight carbon atoms selected from the group consisting of a dihaloalkene and a haloalkyne, the halogen of which has an atomic number from 17 to 53 inclusive.

12. The composition of claim 11 wherein the unsaturated halohydrocarbon is a dihaloalkene.

13. The composition of claim 12 wherein the dihaloalkene is 1,3-dichloropropene.

14. The composition of claim 11 wherein the unsaturated halohydrocarbon is a haloalkyne.

15. The composition of claim 14 wherein the unsaturated halohydrocarbon is propargyl chloride.

16. A process which comprises applying to bacteria and their habitat a bactericidal amount of the salt of hexamethylenetetramine with an unsaturated aliphatic halohydrocarbon of two to about eight carbon atoms selected from the group consisting of a dihaloalkene and a haloalkyne, the halogen of which has an atomic number from 17 to 53 inclusive.

17. The profess of claim 16 wherein the unsaturated halohydrocarbon is a dihaloalkene.

18. The process of claim 17 wherein the dihaloalkene is 1,3-dichloropropene.

19. A composition containing a bactericidal amount of the salt of hexamethylenetetramine with an unsaturated aliphatic halohydrocarbon of two to about eight carbon atoms selected from the group consisting of a dihaloalkene and a haloalkyne, the halogen of which has an atomic number from 17 to 53 inclusive, said salt being in admixture with a mineral oil.

20. The composition of claim 19 wherein the salt is the salt of hexamethylenetetramine with 1,3-dichloropropene.

References Cited by the Examiner

UNITED STATES PATENTS

| | | | |
|---|---|---|---|
| 2,692,231 | 10/1954 | Stayner et al. | 252—8.550 |
| 2,728,767 | 12/1955 | Wolf | 167—330.1 |
| 2,780,598 | 2/1957 | Cafcas | 252—33.4 |
| 2,843,545 | 7/1958 | Wolf | 252—8.55 |
| 2,950,331 | 8/1960 | Duggins | 167—22 |

OTHER REFERENCES

Jacobs et al.: Proceedings of the National Academy of Sciences, vol. 1 (1915), pp. 226–228.

Jacobs et al.: Journal of Biological Chemistry, vol. 20 (1915), pp. 659–665.

Jacobs et al.: Journal of Experimental Medicine, vol. 23 (1916), pp. 563–569.

Smolin et al.: s-Triazines and Derivatives, thirteenth volume of the series The Chemistry of Hetrocyclic Compounds (1959), pp. 479–582 and 487–489.

DANIEL E. WYMAN, *Primary Examiner.*